US007688971B2

(12) United States Patent
Lee et al.

(10) Patent No.: US 7,688,971 B2
(45) Date of Patent: Mar. 30, 2010

(54) NETWORK TELEPHONE EXPANSION SEAT

(75) Inventors: Chang-Hsiung Lee, Taipei (TW);
Yi-Hsiu Tang, Taipei (TW); Kao-Yu Hsu, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 657 days.

(21) Appl. No.: 11/496,494

(22) Filed: Aug. 1, 2006

(65) Prior Publication Data

US 2008/0044008 A1 Feb. 21, 2008

(51) Int. Cl.
*H04M 1/00* (2006.01)
*H04M 9/00* (2006.01)

(52) U.S. Cl. .................... 379/436; 379/428.02

(58) Field of Classification Search ................
379/428.01–428.04, 423, 429, 432, 436,
379/440, 435, 433.12
See application file for complete search history.

(56) References Cited

U.S. PATENT DOCUMENTS 3,838,229 A * 9/1974 Morrell et al. .............. 379/436

5,185,791 A * 2/1993 Itoyama et al. .............. 379/435
7,130,417 B1 * 10/2006 Steigelman et al. .... 379/413.02

FOREIGN PATENT DOCUMENTS

| TW | M256031 | 1/2005 |
| TW | M277197 | 10/2005 |
| TW | M279116 | 10/2005 |

* cited by examiner

*Primary Examiner*—Fan Tsang
*Assistant Examiner*—Phylesha Dabney
(74) *Attorney, Agent, or Firm*—Rabin & Berdo, P.C.

(57) ABSTRACT

A network telephone expansion seat including a housing and a signal conversion module is provided. The housing has a bearing portion for disposing a network telephone thereon. The signal conversion module disposed inside the housing has a circuit substrate. At least one connection interface for transmitting data is disposed on the circuit substrate for connecting the network telephone to transmit data. Meanwhile, the circuit substrate is connected to peripherals such as a printer, a facsimile machine, a card reader, and an MP3 player via the connection interface, thereby expanding the functions of the network telephone.

12 Claims, 3 Drawing Sheets

NETWORK TELEPHONE EXPANSION SEAT

BACKGROUND OF THE INVENTION

1. Field of Invention

The present invention relates to the peripherals of a network telephone, and more particularly to a network telephone expansion seat, which can be combined with a network telephone and has good space utilization.

2. Related Art

Internet, without boundaries or barriers to information communication, has become an indispensable basic element in modern life. The kinds of the peripheral products and various platforms developed along with the use of the Internet are numerous. Therefore, the network telephone that can save lots of telephone fees using the Internet as a remote call bridge has come into being.

Meanwhile, the network telephone has become gradually more popular, and it is indeed attractive in that it is convenient and offers economic benefits to individuals and firms. Therefore, a new type of industry and many relevant patent technologies have appeared in the market accordingly.

In various prior arts, in the aspect of the match of system and software, the network telephone communication device disclosed by the Taiwan Patent No. M277197 has the function of automatically detecting the existence of a computer host for automatically implementing or cutting off telephone communication, besides the function of transmitting speech, short messages, and images. The network telephone gateway for mobile phones disclosed by the Taiwan Patent No. M279116 can be used for connecting an enterprise IP telephony system, an Intranet of an enterprise, or the Internet, to the mobile communication (GSM) system.

As for the user interface, in the external conversion device for a network telephone disclosed by Taiwan Patent No. M256031, a technology is provided to facilitate the operation of a user or an operator by connecting ordinary telephone transmitters, speaker, earphone/microphones, etc. via various types of connection ports.

However, none of the aforementioned patents disclose how to expand the functions of the network telephone while considering more effective utilization of space and decreasing the impact of a messy environment on the working efficiency of a user in a digitalized living or working environment.

SUMMARY OF THE INVENTION

The main object of the present invention is to provide a network telephone expansion seat that can effectively utilize space according to the above requirements.

Another object of the present invention is to provide a network telephone expansion seat with the function of stably combining a network telephone by overlapping.

In order to achieve the above objects, the network telephone expansion seat of the present invention includes a housing and a signal conversion module. The housing has a bearing portion for disposing a network telephone thereon. The signal conversion module disposed inside the housing has a circuit substrate. At least one connection interface is disposed on the circuit substrate for transmitting data with the network telephone. Meanwhile, the circuit substrate is connected to the peripherals such as a printer, a facsimile machine, a card reader, and an MP3 player via the connection interface for expanding the functions of the network telephone.

In order to make the above structures, features, and functions of the present invention more comprehensible, a preferred embodiment is described in detail below with appended drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
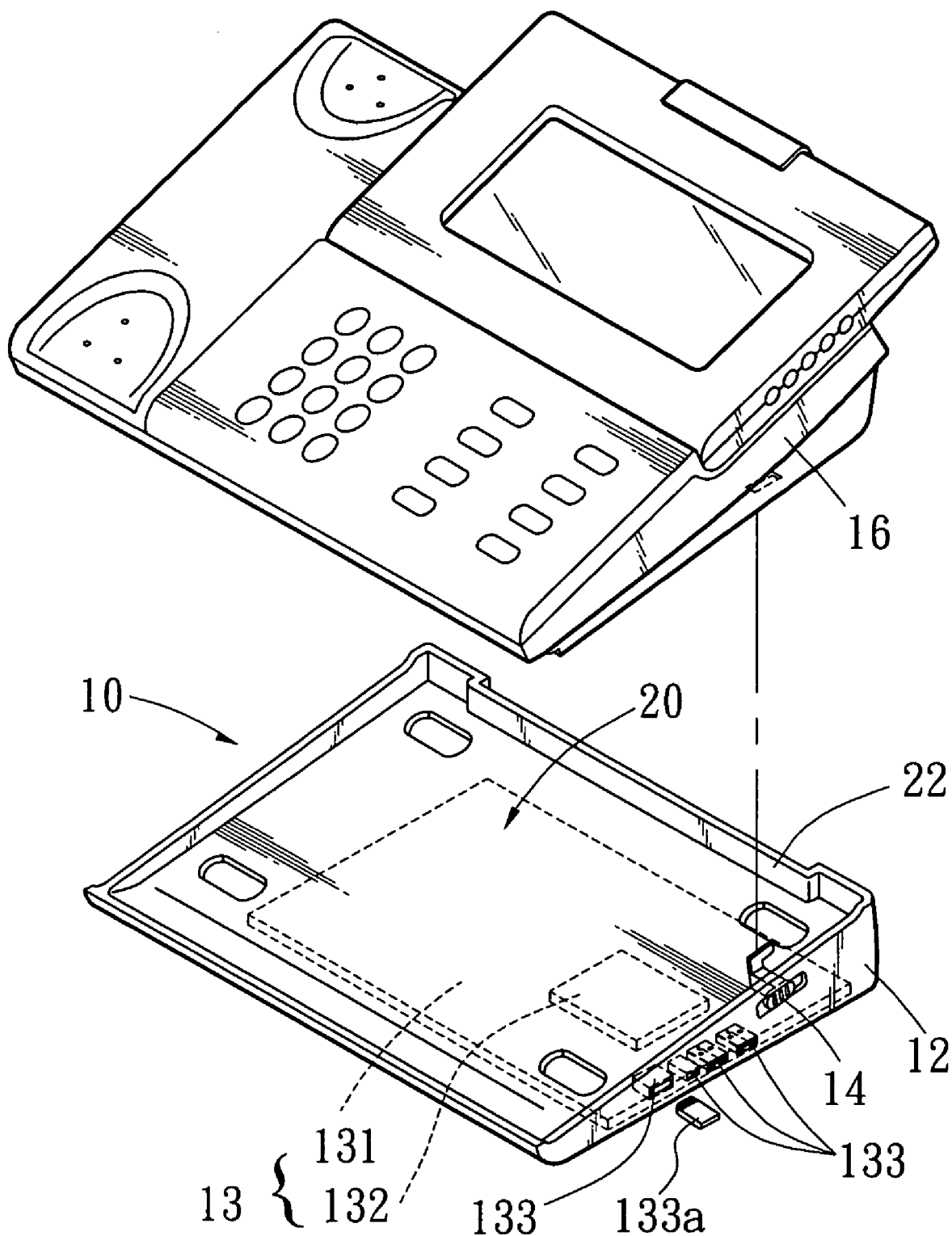
FIG. 1 is an exploded view of the present invention in use with a network telephone.
Figure 2:
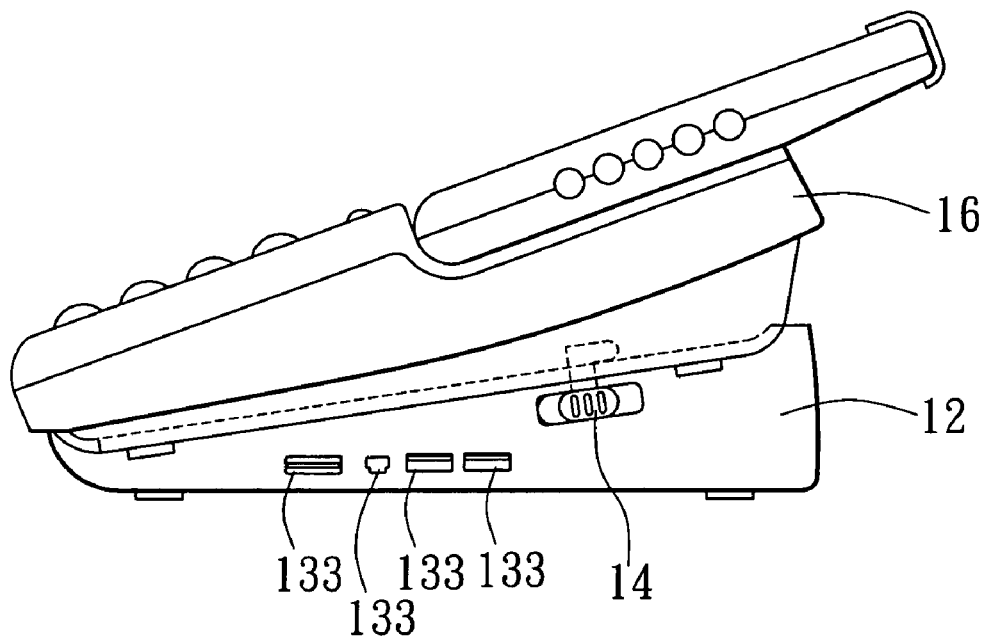
FIG. 2 is a lateral view of the present invention combining with a network telephone.
Figure 3:
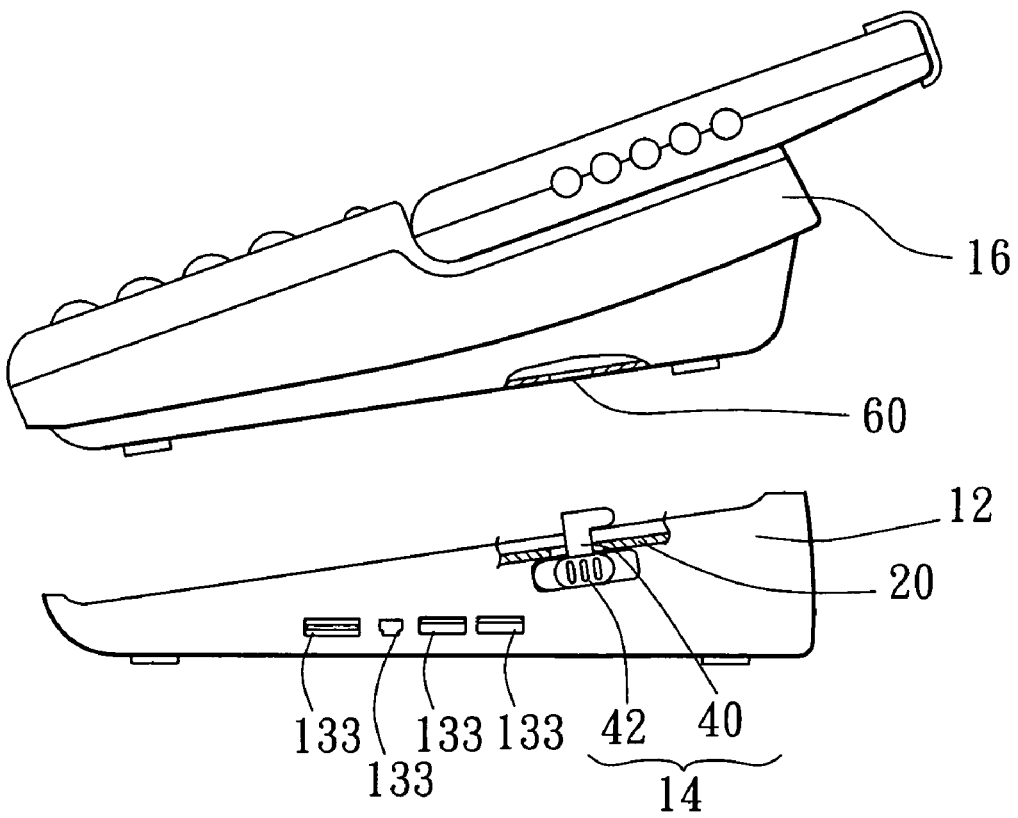
FIG. 3 is a lateral view of the present invention before combining with a network telephone.

Referring to FIGS. 1, 2 and 3, a network telephone expansion seat 10 disclosed by the present invention is constituted by a housing 12 and a fastener 14.

The housing 12 is hollow inside and has a bearing portion 20 for disposing a network telephone 16 thereon. A block wall 22 surrounding the periphery of the housing extends upward by a predetermined height to surround the network telephone 16.

A fastener 14 disposed at one side of the block wall 22 is located at a predetermined position of the housing 12 and can move back and forth thereon. The fastener 14 has a hook end 40 and a pushing end 42. The hook end 40 extends into the block wall 22 while its end slightly bends and extends outside the bearing portion 20. The pushing end 42 extending outside the block wall 22 has the shape and grain convenient for the users to push with fingers.

Figure 4:
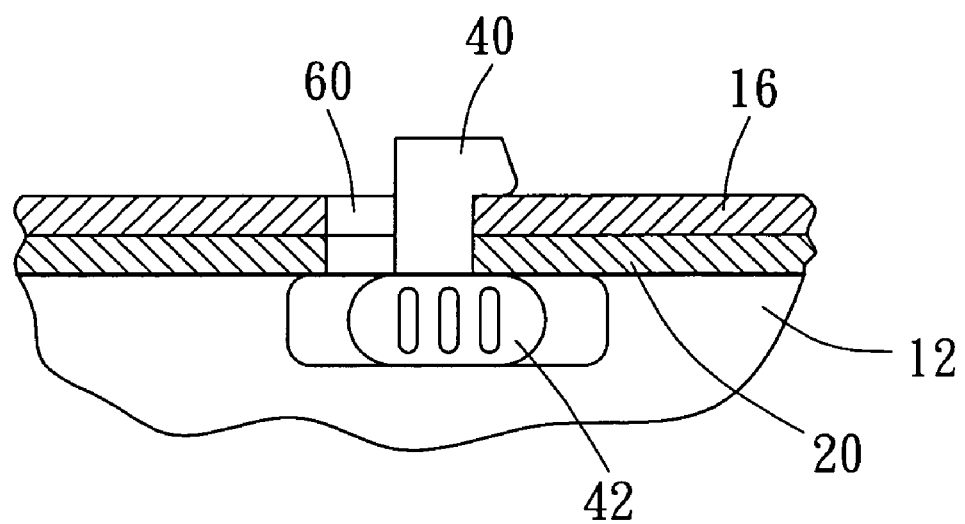
FIG. 4 is an enlarged view of a state of the fastener of the present invention in use.
Figure 5:
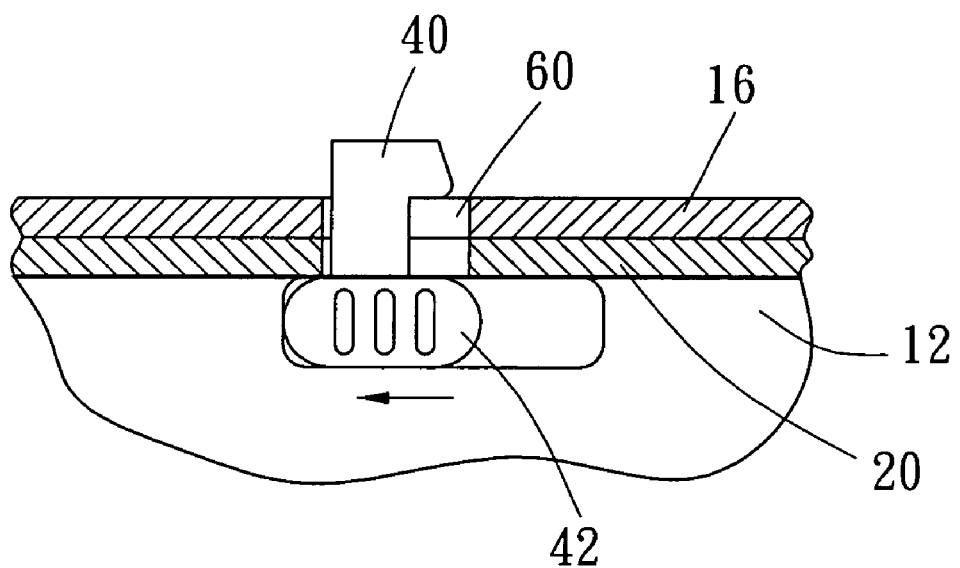
FIG. 5 is an enlarged view of another state of the fastener of the present invention in use.

The bottom of the network telephone 16 can be arranged with a through hole 60 corresponding to the fastener 14 for letting the hook end 40 of the fastener 14 to pass through when the network telephone 16 is accommodated in the block wall 22 (as shown in FIG. 4). After the hook end 40 is forced to move a certain distance by pushing the pushing end 42, the end of the hook end 40 presses against the interior of the bottom of the network telephone 16, thus forcing the bottom of the network telephone 16 to be combined more tightly with the bearing portion 20 (as shown in FIG. 5); as such, the network telephone 16 will not tilt over easily when bumped.

A signal conversion module 13 and multiple connection ports 133 are disposed inside the housing 12. The signal conversion module 13 includes a circuit substrate 131 and a signal-processing module 132 electrically connected the circuit substrate 131 for converting analog signals and digital signals with each other so as to receive or send digital signals. In addition, the signal-processing module 132 further includes a memory cell for storing system software, parameter settings, and the like. The memory cell can be a flash memory, a random memory, or a card reader, and the like. Each of the connection ports 133 protruding out of the side edge of the housing 12 is used for electrically connecting the network telephone 16, microphone, or computer and various connecting lines. The connection port 133 can be a USB port, a microphone connection port, a speaker connection port, or the like. Moreover, it can also be a card reading unit for reading an electronic card 133a. It is convenient to use and manage by intensively arranging various devices of the network telephone.

With the arrangement of the bearing portion 20, the housing 12 and the network telephone 16 can be connected by overlapping each other. Therefore, as for space utilization, much space is saved compared with disposing the housing and the network telephone on the desktop side by side.

The design of intensively arranging various electronic devices by the signal conversion module 13 in advance can not only effectively utilize the space, but it is also convenient for the user to connect the network telephone 16 to electronic devices or computer peripherals, such as a printer, a facsimile machine, a card reader, a walkman, an MP3 player, and the like all together via each connection port 133 for transmitting data at any time, such as printing or changing telephone rings. Thus, the additional value of the functions and applications of the network telephone 16 can be significantly increased, since functional expansion is not limited to call-related functions.

As for the data transmission manner, besides the wired way of data transmission with the use of connection port 133 such as a USB or an IEEE 1394, a wireless connection interface such as Bluetooth or infrared rays can also be used, either in addition or alone, to transmit data between the network telephone expansion seat 10 and each of the electronic or computer peripherals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A network telephone expansion seat, comprising:
a housing having a bearing portion for disposing a network telephone thereon and a block wall surrounding a periphery of the housing;
a fastener disposed on a side of the block wall for fastening the network telephone to the housing, the fastener having a hook end extending out of the bearing portion and being slidable back and forth along the side of the block wall that the fastener is disposed on; and
a signal conversion module disposed inside the housing, the signal conversion module including a circuit substrate with a plurality of connection ports disposed thereon for exchanging data, the signal conversion module carrying out data transmission between the network telephone and the network telephone expansion seat.

2. The network telephone expansion seat as claimed in claim 1, wherein the block wall extends upward by a predetermined height from the periphery of the housing.

3. The network telephone expansion seat as claimed in claim 1, wherein the fastener has a pushing end protruding out of an outer edge of the housing, the pushing end being slidable along the side of the block wall that the fastener is disposed on.

4. The network telephone expansion seat as claimed in claim 3, wherein the hook end is located above the bearing portion, while the network telephone disposed on the bearing portion has a through hole for the hook end to pass through.

5. The network telephone expansion seat as claimed in claim 3, wherein the hook end extends from below the bearing portion to the above, while the network telephone disposed on the bearing portion has a through hole for the hook end to pass through.

6. The network telephone expansion seat as claimed in claim 3, wherein the signal conversion module is connectable to the network telephone via the connection ports for transmitting data of changing telephone rings.

7. The network telephone expansion seat as claimed in claim 1, wherein the data transmission between the expansion seat and the network telephone is carried out in a wired way.

8. The network telephone expansion seat as claimed in claim 7, wherein the wired way of transmission includes a USB port connection or an IEEE 1394 connection.

9. The network telephone expansion seat as claimed in claim 1, wherein the data transmission between the expansion seat and the network telephone is carried out in a wireless way.

10. The network telephone expansion seat as claimed in claim 9, wherein the wireless way of transmission includes a Bluetooth transmission or an infrared ray transmission.

11. The network telephone expansion seat as claimed in claim 1, wherein the connection ports further include a plurality of connection devices including a USB port and a card reader.

12. The network telephone expansion seat as claimed in claim 1, wherein a telephone control interface is disposed inside the housing for connecting to a telephone system via a telephone connection port.

* * * * *